United States Patent [19]
Kearby et al.

[11] Patent Number: 5,750,217
[45] Date of Patent: May 12, 1998

[54] METHODS AND MATERIALS FOR SPLICING TUBULAR FOOD CASINGS

[75] Inventors: Ronald S. Kearby, Williamsport, Ind.; Mark Lee Fox, Liberty; Mark David Kelley, Kansas City, both of Mo.

[73] Assignee: Devro-Teepak, Inc., Westchester, Ill.

[21] Appl. No.: 10,021

[22] Filed: Jan. 25, 1993

[51] Int. Cl.⁶ ............... B65D 81/34; B65H 69/08
[52] U.S. Cl. .......... 428/34.8; 428/36.6; 428/508; 426/105
[58] Field of Search ............... 428/34.8, 36.6, 428/57, 58, 508, 903.3; 426/105; 138/118.1, 120

[56] References Cited

U.S. PATENT DOCUMENTS

| | | | |
|---|---|---|---|
| 2,631,509 | 3/1953 | Whydaw | 93/94 |
| 3,560,223 | 2/1971 | Turbak | 99/109 |
| 3,669,692 | 6/1972 | Turbak | 99/176 |
| 3,794,515 | 2/1974 | Turbak et al. | 117/145 |
| 4,032,176 | 6/1977 | Tabary | 285/18 |
| 4,610,742 | 9/1986 | Rop et al. | 156/158 |
| 4,736,775 | 4/1988 | Onley | 428/61 X |

FOREIGN PATENT DOCUMENTS

| | | |
|---|---|---|
| 0058240 | 10/1981 | European Pat. Off. |
| 0181551 | 10/1985 | European Pat. Off. |

*Primary Examiner*—Daniel Zirker
*Attorney, Agent, or Firm*—Michael L. Dunn

[57] ABSTRACT

A splice for regenerated cellulose tubular food casing. The splice includes a splicing tape comprising a regenerated cellulose film coated on at least one surface with a polyvinylidene chloride polymer (saran) and having a film thickness of 0.002 to 0.01 inches. The splicing tape is perforated to remove from ten to thirty percent of the area of the film. The removal of material from the splicing tape provides an elongation at break of at least twenty percent at a tensile force of between 500 and 1250 psi in a direction transverse to the direction of the longitudinal axis of the casing. The break force in that direction should be at least 100 psi greater than the force required to obtain the desired elongation. To form the splice, the splicing tape is wrapped around and sealed at the coated surface to a leading end of a first regenerated cellulose tubular food casing and a trailing end of a second regenerated cellulose tubular food casing wherein the ends are proximate each other.

11 Claims, 3 Drawing Sheets

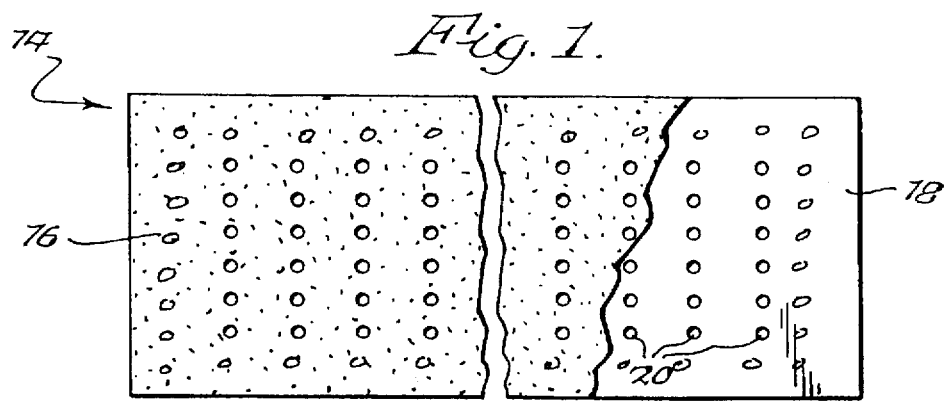
Fig. 1.
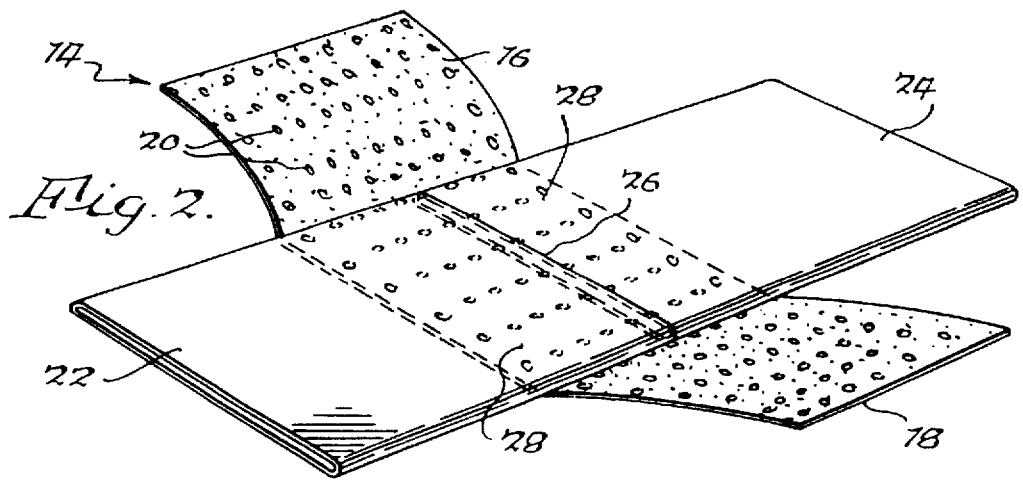
Fig. 2.
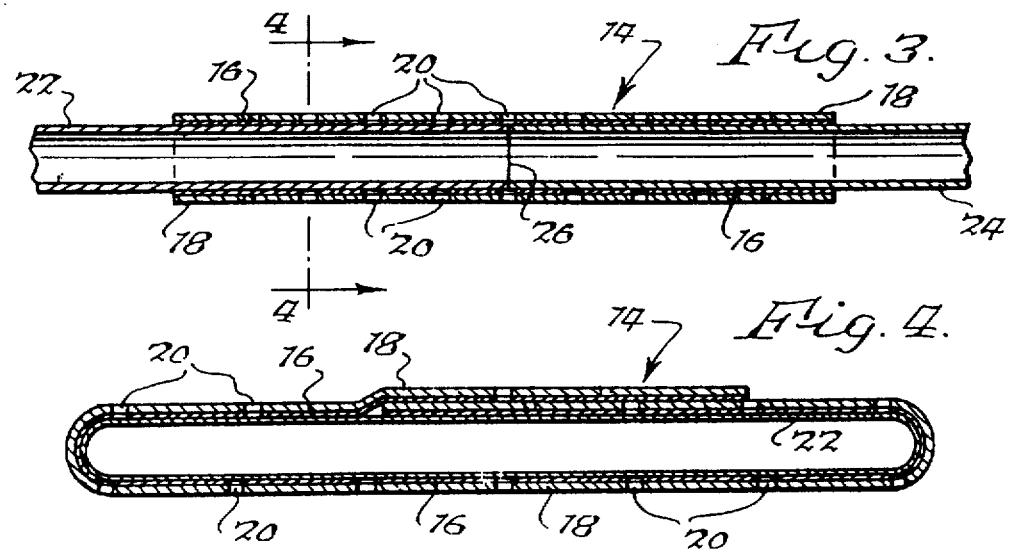
Fig. 3.
Fig. 4.

METHODS AND MATERIALS FOR SPLICING TUBULAR FOOD CASINGS

BACKGROUND OF THE INVENTION

The present invention relates to methods and materials for joining sections of flexible tubing together to form continuous lengths for various applications, especially, for example, casings for packaging food products like sausages, meats, cheeses and the like.

Tubular food casings, and more particularly, sausage casings like those made of regenerated cellulose and collagen have been widely used in processing frankfurters, bolognas, salamis, hams, etc. Tubular casings of various lengths are manufactured, for instance, by extruding viscose into a fibrous web which is then regenerated in a coagulating bath. The regenerated tubular material is washed to remove by-products, further treated and rolled flat onto large reels. In some instances, the casing is dried and shirred into tubular strands, or alternatively, left unshirred with sufficient water, plasticizer, etc., such that further soaking need not be performed prior to stuffing by food processors. In either instance, a casing reel may contain several lengths of flat reelstock totaling several hundred feet.

The optimum length of continuous casing will vary depending on the particular apparatus, e.g. shirring, filling, employed. In general however, short lengths of casing will be inefficient, necessitating frequent stoppages of automated equipment to allow time to thread a new section of casing through the apparatus. For this reason, it has been found highly desirable to join or splice the end of one tubular casing to the beginning of a new section of tubular casing before the end of the first section begins its passage through the apparatus. The end portion of first section will then serve to pull the first section of the newly spliced section through the apparatus. In this manner, the need for frequent rethreading of the apparatus and restoring the cycle after each short length of casing material is run through can be avoided.

Various methods and materials have been proposed for splicing tubular casings. For example, U.S. Pat. No. 4,032,176 discloses several methods for assembling lengths of tubular casings end-to-end using pressure sensitive adhesive strips. It has been found, however, that unless splices are bonded with strips which are sealed with appropriate heat and pressure the frequency of joint separation can increase significantly, especially with casings having high moisture levels. Pressure sensitive adhesives do not form fully cured bonds, but instead, remain tacky. Consequently, such joints are not completely reliable, particularly since they must be machinable, remain intact when wet and be able to withstand the forces generated by stuffing equipment.

U.S. Pat. No. 2,631,509 discloses a method of making tubular articles from a continuous sheet which is drawn through a tube forming guide. As the tube is formed, a lapped edge is made and a bead of thermoplastic material simultaneously deposited therebetween. The edge is sealed under heat and pressure. U.S. Pat. Nos. 3,560,223 and 3,669,692 disclose the fabrication of tubular articles from flat reelstock. The latter patents, however, relate specifically to casings for liver sausage, and therefore, have surfaces coated with saran polymer. In each of the immediate foregoing patents, the edges of the tubes are sealed without splicing tape. That is, the heat sealed joints of the prior art casings are bonded with an adhesive only which is non-supportive. The absence of a backing for the adhesive diminishes the machinability of the bonded joint especially when wet, and therefore, overall reliability is also diminished.

U.S. Pat. No. 4,610,742 describes a method for splicing tubular food casings, especially wet sausage casings, by using a splicing tape comprising cellulose backing coated with saran polymer (polyvinylidene chloride and copolymers). The splicing tape could be provided with perforations which permitted the escape of steam generated when the tape was sealed to moist casing. Such perforations were provided only in a quantity sufficient to permit escape of steam and for no other reason.

The quantity of perforations necessary to permit escape of steam required removal of a very low percentage of film material and in fact when the film was "stuck" no material was actually taken away from the splicing tape. Such stuck casing had another disadvantage since jagged or sharp edges were often left around the hole formed in the casing which could act as sites for the commencement of tears in the casing.

As seen in FIGS. 1, 2, and 5, which actually show exaggerated removal of material to allow escape of steam (see description of figures), the holes in the splicing material account for no more than three percent of the surface area of the splicing tape.

While the splices of U.S. Pat. No. 4,610,742 showed improvement with respect to peel strength of the splice and ability to be machined and stuffed, a serious disadvantage remained. In particular the splice did not have sufficient stretch at reasonable stretch force, e.g. below 1250 psi, to permit it to pass over the horn ring of a stuffing horn while maintaining its integrity, especially when commercially available saran coated cellulose films were used.

This disadvantage was especially serious since a very important reason for splicing food casings is during stuffing operations in order to avoid costly down time and costly food and casing loss required by rethreading the casing over the stuffing horn each time the casing being used comes to its trailing or terminal end.

Accordingly there is a need for a cellulose food casing splice which is strong enough and at the same time has sufficient stretch, e.g. 10 to 20%, at a low enough stretch force, e.g. below 1250 psi, to permit the splice to pass over the horn ring of a stuffing horn. The tensile strength in the direction of stretch, i.e. transverse to the longitudinal axis of the casing, should be at least 100 psi greater than the stretch force required to be used to obtain sufficient elongation for the casing splice to pass over the horn ring. A further disadvantage of prior splices was the difficulty in automatically removing them after they had performed their function of pulling or leading the next casing through the machinery in question. There is therefore a need for a splice which is readily automatically detected and removed.

BRIEF DESCRIPTION OF THE INVENTION

The invention comprises a splice for regenerated cellulose tubular food casing. The splice includes a splicing tape comprising a regenerated cellulose film coated on at least one surface with a polyvinylidene chloride polymer (saran) and having a film thickness of 0.002 to 0.01 inches.

The splicing tape is perforated to remove from ten to thirty percent of the area of the film. The removal of material from the splicing tape provides an elongation at break of at least twenty percent at a tensile force of between 500 and 1250 psi in a direction transverse to the direction of the longitudinal axis of the casing. The break force in that direction should be at least 100 psi greater than the force required to obtain the desired elongation of from 10 to 20 and preferably 15 to 20 percent. The perforations are preferably removed by punching to form holes having smooth edges to avoid ragged edges left by forming holes using other methods. Such ragged edges tend to be sites at which tears are initiated.

To form the splice, the splicing tape is wrapped around and sealed at the coated surface to a leading end of a first regenerated cellulose tubular food casing and a trailing end of a second regenerated cellulose tubular food casing wherein the ends are proximate each other. Proximate each other as used herein means that the ends are separated by less than a centimeter and usually abut or else the casings overlap in the sense that one of the casings is telescoped into the other casing. Usually to avoid catching an edge of a casing, the trailing end of the casing which has entered the machine in question is telescoped into the leading end of the casing which has not yet entered the the machine in question.

The splice according to the invention has a 20% stretch at from 500 to 1250 psi stretch force, preferably 900 to 1150 psi stretch force, and has a break strength in the direction of stretch of at least 100 psi greater than the stretch force required to reach 20% stretch. The splice of the invention will retain its integrity while easily passing over a horn ring on a stuffing horn which is up to twenty percent larger, preferably 15 to 20 percent larger, in circumference than the nominal uninflated circumference of the casing.

The splice of the invention is especially suitable for use with a premoisturized casing containing at least about twenty percent water based upon total casing weight. Such a premoisturized casing usually contains from 20 to 40 percent water based on total casing weight.

The splice of the invention desirably uses a splicing tape containing a marker which permits automatic identification and removal of the splice after it passes over a horn ring on a stuffing horn. Examples of suitable markers may include a pigment which can be detected by means of a photocell or may include a substance which can be magnetically detected.

DETAILED DESCRIPTION OF THE INVENTION

Splicing according to the present invention is carried out by the steps of assembling the trailing end of a first casing and the leading end of a second casing to form a joint. The joint is then contacted with the splicing tape as such tape has been previously described and bonded by compressing and heating to a temperature sufficient to soften or melt the saran polymer without causing it to degrade. The pressure forces the softened polymer into intimate contact with the surfaces of the casings being spliced. Hence, the saran polymer coated cellulosic splicing tape provides low bulk, high shear and high shock strength splices for food casings. When fully bonded, the splices exhibit superior peel strength and can be used to splice virtually all casings, including dried casings. However, because the bonds are also water impervious, the splicing tape and methods of use are especially well suited for splicing wet or premoisturized, ready-to-stuff type casings. The splices are shirrable and stuffable, and because they are low bulk are also machinable. The splice thus formed is particularly good for use in stuffing operations since it has sufficient stretch and strength to pass over the horn ring of a stuffing horn.

BRIEF DESCRIPTION OF THE DRAWINGS

For a further understanding of the invention as well as its characterizing features, reference should now be made to the following detailed description thereof taken in conjunction with the accompanying drawings, wherein:

FIG. 1 is a top view of a strip of splicing tape according to the present invention.

FIG. 2 is a perspective view of casing segments arranged in abutting relation partially wrapped with the splicing tape of FIG. 1.

FIG. 3 is a longitudinal cross-sectional view of the finished splice of FIG. 2;

FIG. 4 is a transverse cross-sectional view of the splice taken along line 4—4 of FIG. 3;

DESCRIPTION OF THE PREFERRED EMBODIMENTS

Figure 5:
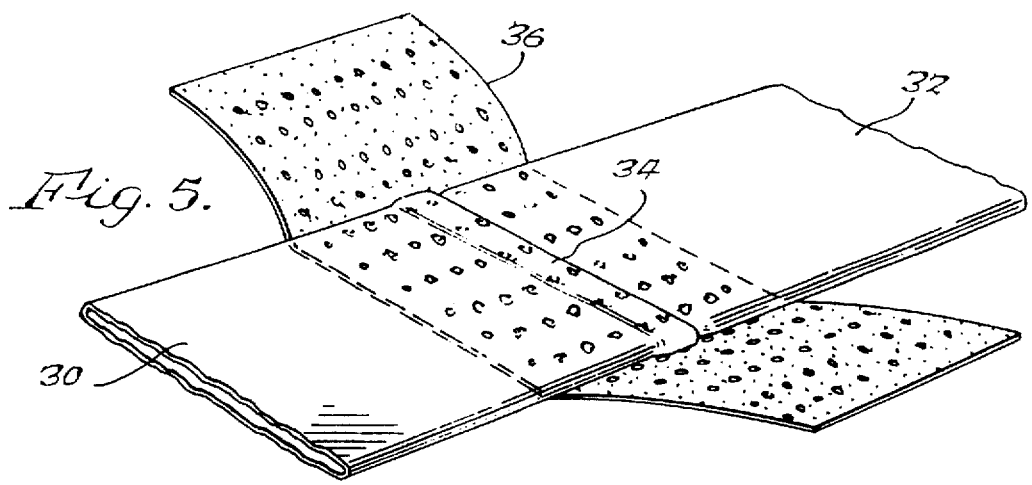
FIG. 5 is a perspective view of a partially wrapped joint where the end of one segment is telescoped inside the other.

Turning now to FIG. 1, there is provided a strip of splicing tape 14 having an outer saran polymer coating 16 on at least one surface thereof. The tape is comprised of a backing 18 formed of a cellulose film, which would include, for example, regenerated cellulose, cellophane, rayon and other such manufactured polymers. Regenerated cellulose is intended to include both clear, regenerated cellulose films and films of fibrous reinforced regenerated cellulose. The principal criteria in selecting a specific cellulose backing material is that it have a higher melting or scorching temperature than the melting point of the outer saran polymer coating.

The cellulose backing may be prepared by any of the well known methods in the art, including the viscose process, cuprammonium process, by denitration of cellulose nitrate, and the like. For example, clear regenerated cellulose films can be prepared by extruding viscose into a coagulating bath containing ammonium sulfate, sodium sulfate and sulfuric acid. The regenerated cellulose is removed from the coagulating bath and washed to remove reactants and by-products. In the case of the stronger fibrous reinforced regenerated films, the manufacturing process is modified to insert a web preferably, for example, a long fiber hemp paper into the film. A fibrous web is passed through a coating die where viscose is extruded into the web followed by treatment in a coagulating bath where the cellulose is regenerated to produce a paper-reinforced film typically containing from about 35 to about 40% paper and from about 60 to about 65% regenerated cellulose and plasticizing ingredients e.g. glycerin and water.

In preparing the splicing tape, a thin preferably continuous coating of a saran polymer is applied to at least one surface of the backing material. The expressions "saran polymer" and "saran adhesive" as used herein are intended to include a family of known thermoplastic resins, such as vinylidene chloride homopolymer and copolymers of vinylidene chloride with at least one other monomer, such as vinyl chloride, acrylonitrile, acrylates, methacrylates and their lower alkyl esters e.g. . . . methyl, ethyl; vinyl acetate, etc. Copolymers of vinylidene chloride with other monomers are generally described in terms of the weight ratio of the monomer units in the copolymer. Saran, preferably has at least about 50 percent vinylidene chloride. However, copolymers containing as little as 10 percent vinylidene chloride are also included within this term in accordance with the present invention.

"Splicing tape" as used herein requires a saran coating having sufficient vinylidene chloride to permit the formation of a strong bond with the cellulose backing. The saran adhesive coating may be applied by conventional methods known in the art. The objective in each instance is to prepare a flexible splicing tape with a thin, continuous, adherent coating of the adhesive onto the cellulose backing for optimum peel and shock strength properties, especially when the spliced segments of casing are moistened or wet. For example, saran polymers can be applied directly onto tape backing by the methodology described in U.S. Pat. No. 2,961,323. There, a saran polymer either in an aqueous or non-aqueous system is applied to uncoated cellulose by various techniques, including dipping or by means of a doctor blade, spraying or by extrusion. Good adhesion of the saran is achieved by drying followed by heating at temperatures sufficient to sinter the coating, but at temperatures below those which will adversely affect the cellulose base.

Alternatively, the saran polymer may be applied by means of a self-priming coating composition, such as described in U.S. Pat. No. 3,794,515 where a saran resin, a plasticizer, a polymeric polyisocyanate and an activator are applied from a solvent system. There, tubular cellulose is coated with one-coat lacquer and then cured by heating. As a further alternative, the cellulose substrate may be primed as a separate step before applying the saran adhesive. For example, after the cellulose has been regenerated, washed, plasticized, etc., and while it is still in the gel state and prior to drying, may be treated with a food acceptable grade adhesion primer for even more tenacious adherence of the saran polymer to the tape backing. One especially preferred primer is an epoxy-substituted resin consisting of a water-soluble thermosetting reaction product of a polysecondary amine. More specifically, they are polymers of epichlorohydrin having a plurality of —NH— groups and having an epoxide equivalent weight of at least about 100, and preferably less than 2000, as determined by reaction with mercapto-ethanol in the procedure described in Bates TAPPI, 52, No. 6, 1969, page 1163. The epoxy-substituted primers especially preferred for use in coating the tape backing are available under the name Kymene, a registered trademark of Hercules Powder Company, Wilmington, Del.

Good adhesion properties are obtained when the foregoing primer is applied to the tape backing in minor amounts. Generally, this means the concentration of the primer resin employed is at least 0.5%, and ranges up to 5% or more. The primer resin is cured by heat drying. The saran coating can then be applied to the primed casing, for instance, according to methods disclosed in U.S. Pat. Nos. 3,794,515; 2,961,323, etc.

It is to be understood, the present invention also contemplates laminated splicing tapes prepared by laminating saran films onto cellulose backings consisting of 1 to 4 inch wide flat, continuous webs of regenerated cellulose. Most preferable, however, the tapes are fabricated from food casing materials having saran polymer coatings where in normal use the casing material provides the needed barrier properties against water loss and oxygen induced discoloration of iron rich meat products, such as liverwurst, hamburger, etc., encased therein. Liverwurst and braunschweiger are commonly packaged in saran coated fibrous casings having controlled moist-vapor permeability. Such casings are frequently supplied as flat reelstock either with an exterior or interior coating of a saran polymer. Splicing tapes can be prepared by severing tubular casings transversely to their longitudinal axes or by slitting the casings longitudinally on one or both edges of flattened reelstock. By slitting a segment of the flattened saran coated tubular material on one edge, a suitable splicing tape can be prepared by laying open the material and cutting to suitable lengths depending of the size of the casings being spliced.

Such saran coated regenerated cellulose materials as are commercially available usually have a thickness of from 0.005 to 0.0065 inches and have insufficient stretch to pass over the horn ring of a stuffing horn, i.e. a stretch requirement of from about 11 to about 20 percent,without frictionally adhering to the horn ring or delaminating from the casing, tearing or otherwise losing splice integrity.

In accordance with the present invention the splicing tape used in the splice must have the necessary stretch as above described. In order to obtain the required stretch, regardless of the method of fabrication of the splice, the splicing tape must be provided with a plurality of holes such that from ten to thirty percent of the area of the splicing tape is removed. In order to accomplish that result from ten to thirty holes per square inch of surface area of the splicing tape are usually made. The hole diameter usually varies between one sixteenth and three sixteenths inch (1.6 to 4.8 mm) and are preferably formed in a regular repeating pattern such that holes laying on the same straight line are at least approximately equally spaced.

In using the tape for splicing, generally the trailing end of one casing is brought, for example, into juxtaposition with the leading edge of the next casing and assembled into an appropriate joint. For instance, a three inch wide strip of saran coated splicing tape is wrapped around the assembled joint with the saran coating in contact with the casings being spliced. Preferably, the splicing tape is brought entirely around the joint and the ends lapped. The wrapped joint is then subjected to "programmed" heat and pressure over a period of time whereby the saran polymer at least softens, but more preferably softens and melts into intimate contact with the surfaces of the casings being spliced. When the splice cools and the saran adhesive hardens an extremely strong, water impervious bond results.

In splicing casing segments, the surfaces of the casings in contact with the splicing tape may be treated with an adhesion promoter in the form of a primer coating. Such coatings are frequently used on the exterior surface of cellulose casings to improve, for example, the adhesion of printing inks. Similarly, they are often used on the interior surfaces of tubular casings used for liverwurst, braunschweiger, etc., to enhance the adhesion of the meat to the casing, avoiding unappetizing fatty deposits from forming between the interior wall of the casing and the outer surface of the meat product. Such coatings include, for instance, Kymene resins, e.g. . . . Kymene 557 previously described. Other appropriate primers would include food grade polymeric polyisocyanates, such as described in U.S. Pat. No. 3,912,839. Although the surfaces of the spliced casing segments in contact with the splicing tape need not have an adhesion promoter in every instance, the use of an adhesion promoter is especially desirable when the casing segments being spliced are in a moistened or wet condition.

FIGS. 2 and 3 disclose the trailing end of casing segment 22 and the leading end of casing segment 24 with their respective terminal transverse edges in abutting relation 26.

The outer surfaces of segments 22 and 24 have a primer coating 28, for example, Kymene resin applied before splicing for stronger bonds after sealing. The splicing tape 14 having a width generally in the range of about 1 to about 4 inches, if first wrapped on the backside of the segments, folded over and then lapped, as best shown in FIG. 4.

Figure 6:
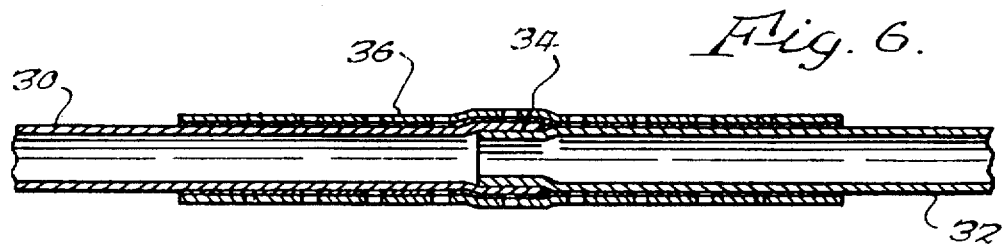
FIG. 6 is a longitudinal cross-sectional view of the finished splice of FIG. 5.

FIGS. 5 and 6 disclose an alternative method of splicing tubular casings where the leading edge of casing segment 32 is telescoped inside the trailing edge of casing segment 30 to form joint 34. Splicing tape 36 of appropriate width and length prepared according to the methods described hereinabove is wrapped around the joint and sealed by the application of heat and pressure.

Bonding the tape to the assembled joint is best accomplished by applying sufficient heat and pressure over a period of time sufficient to soften, and more preferably, melt the saran polymer in the tape without causing it to degrade. It was discovered that if the heating cycle is too long and the saran is exposed to temperatures and pressures sufficient to degrade the polymer hydrochloric acid is liberated. Under such circumstances, the acid rapidly attacks and weakens the splice and spliced material rendering the tubular casing useless for all practical purposes as food wrapping. As the material ages during storage, it can be slowly dissolved by the acid. Correspondingly, if too little heat and/or pressure is applied or the heating cycle is too brief to allow the saran to melt, the polymer will not make adequate contact with the tubular material to securely bond the casings. Hence, splices of this later type will also be weak and lack the needed peel strength, and may fail.

The duration of the heating cycle and temperatures employed can be ascertained through the exercise of ordinary skill. They are dependent, for instance, on the particular saran polymer employed in the splicing tape, the composition of the casing materials being spliced, as well as the thickness of the casing materials. It will be understood that heating sealing cycles can be shortened by utilizing elevated heat sealer temperatures and pressures without necessarily scorching or degrading the splicing tape. Similarly, cycles can be lengthened provided more moderate temperatures and pressures are utilized. Higher temperatures can be advantageously employed when the casings being spliced are wet or in a moistened, ready-to-stuff condition. The object in each instance is to achieve "good peel strengths" which for purposes of the present invention are intended to mean delamination of the casing rather than the splicing tape when the tape and casing are pulled at a 90° angle.

Figure 7:
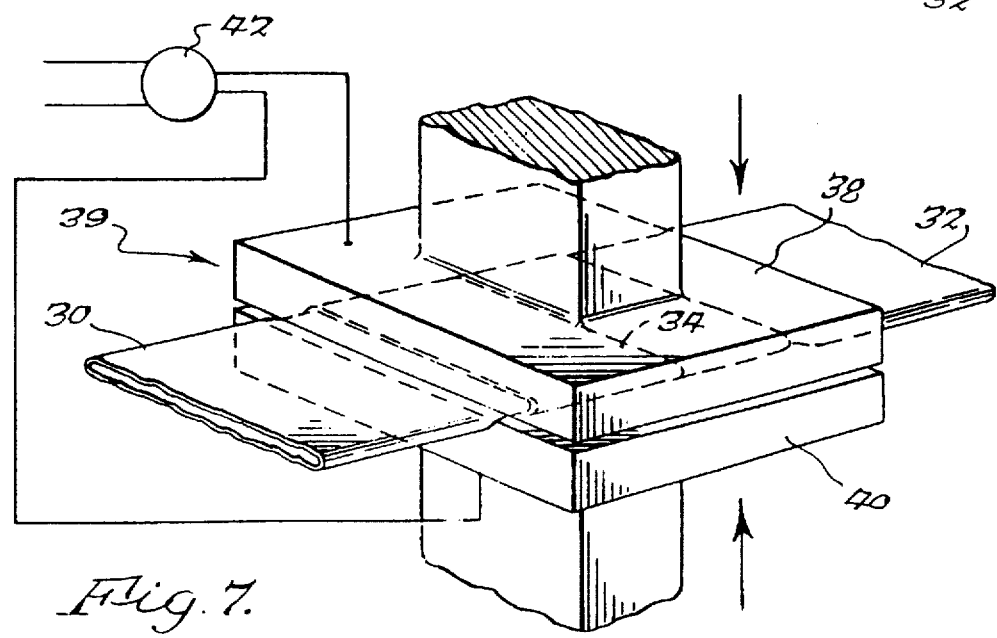
FIG. 7 is a perspective-diagrammatic view of spliced casings being bonded with a heat sealer.

FIG. 7 illustrates diagrammatically upper heat sealer jaw 38 and lower heat sealer jaw 40 of an electrical heat sealer apparatus 39 of known design applied under pressure, simultaneously to the upper and lower surfaces of joint 34. The temperature of the sealing jaws is regulated by control rheostat 42. Such units are commercially available through ordinary channels of commerce, and include those available from the Vertrod Corporation, Brooklyn, N.Y.

The present invention also contemplates embodiments where the casings being spliced have an outer or inner surface coated with a saran polymer. Tubular food casings having an outer saran coating for controlled moisture-vapor permeability used in packaging liverwurst and braunschweiger, for instance, can be spliced together, for example, by telescoping the end of one segment inside the end of another segment, as illustrated by FIGS. 5 and 6. The outer saran polymer coating and the inner adhesion primer of such casings even permit splicing the casing segments together without splicing tape. However, the present invention provides for the use of splicing tape previously described with backing for reinforcement and maximum peel strength, especially when wet.

Figure 8:
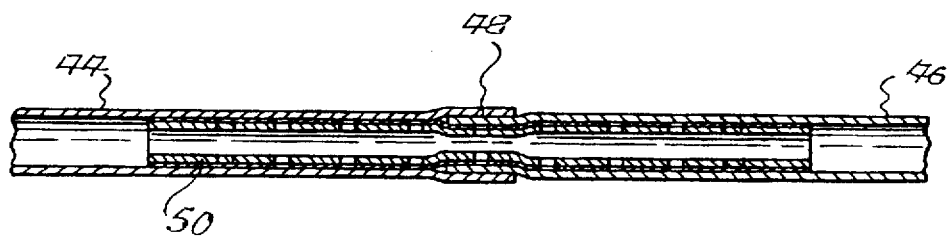
FIG. 8 is a longitudinal cross-sectional view of a telescoping joint bonded in the interior with the splicing tape.
Figure 9:
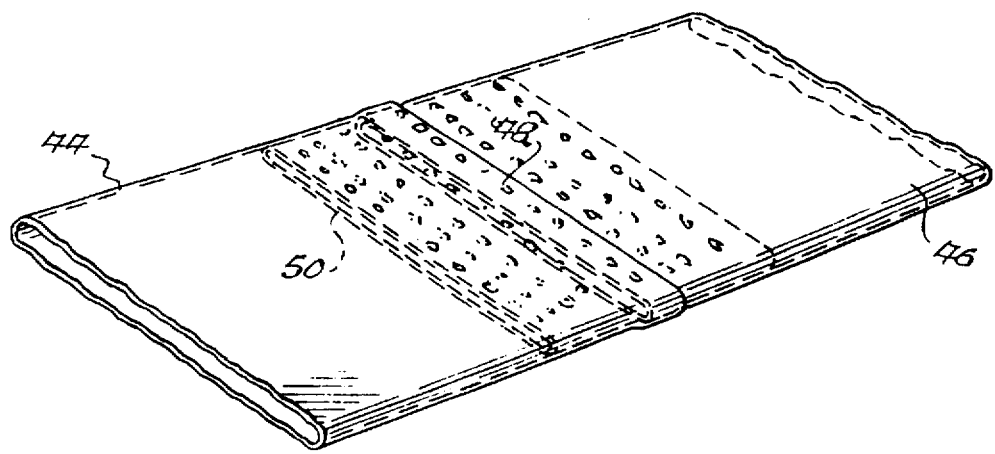
FIG. 9 is a perspective view of the fully bonded casing of FIG. 8.

Casings having inner saran coatings, like those available under the name "Faserin", a registered trademark of Teepak, Inc., Danville, Ill., cannot be spliced together by heat sealing without a cellulose backing with or without a saran adhesive placed inside the joint. Accordingly, FIGS. 8 and 9 illustrate a further embodiment whereby food casing 46 having an inner saran coating is telescoped into casing 44, also having an inner saran coating, to form a joint 48 after a sleeve of splicing tape 50 is inserted into one end. The saran polymer of the splicing tape faces the inside wall of the casing so when heat sealed blockage at the joint will not occur.

EXAMPLE

In order to demonstrate the differences between the splicing tape of the invention and prior known splicing tapes, each of several splicing tapes were tested for stretch at break and tensile strength in a transverse direction to the longitudinal axis of casing to which the tape is to be applied. The tapes tested are listed in Table 1. The first four A–D are saran coated splicing tapes used in the prior art. Sample D is a tape in accordance with the present invention.

TABLE 1

| Tape | holes/sq in | avg hole dia | % loss area/sq in | thickness |
|------|-------------|--------------|-------------------|-----------|
| A    | 1.533       | 0.015        | 0.027%            | 0.0054 in |
| B    | 1.533       | 0.045        | 0.244%            | 0.0052 in |
| C    | 1.6         | 0.055        | 0.380%            | 0.0062 in |
| D    | 0           | 0            | 0                 | 0.0057 in |
| E    | 279         | 0.125        | 22.826%           | 0.0053 in |

The elongation at break and the tensile strength at break are given in Table 2 for tapes A–E.

TABLE 2

| Tape | Average tensile psi at break | Elongation at break |
|------|------------------------------|---------------------|
| A    | 3425                         | 34.15               |
| B    | 3175                         | 29.89               |
| C    | 2998                         | 33.83               |
| D    | 3478                         | 37.23               |
| E    | 1171                         | 23.02               |

The above splicing tapes were further tested on the same machine to determine stretch force in order to obtain a stretch of 20%. The results are set forth in Table 3.

TABLE 3

| Tape | Average stretch psi | Elongation |
|------|---------------------|------------|
| A    | 2000                | 20%        |
| B    | 1852                | 20%        |
| C    | 1613                | 20%        |
| D    | 1866                | 20%        |
| E    | 1056                | 20%        |

As can be readily seen, of the tapes tested only the tape of the invention has a stretch psi below 1250 psi to obtain a stretch of 20%, while simultaneously having a break psi over 100 psi greater than the 20% stretch psi. As a further test, casings spliced with the splicing tape of the invention are tested by stuffing with bologna. The casing has zero inflated diameter of 4.86 inches and must expand over a horn ring having a 5.77 inch diameter. Only sample E stretched to pass over the horn ring while the remaining samples either seized on the horn ring or broke.

What is claimed is:

1. A splice for regenerated cellulose tubular food casing comprising a splicing tape comprising a regenerated cellulose film coated on at least one surface with a polyvinylidene chloride polymer and having a film thickness of 0.002 to 0.01 inches and being perforated to remove from ten to thirty percent of the area of the film and to provide an elongation of from ten to at least twenty percent at a stretching tensile force of between 500 and 1250 psi in a direction transverse to the direction of the longitudinal axis of the casing, said tape having a tensile strength at break of at least 100 psi greater than the stretching tensile force, said splicing tape being wrapped around and sealed at the coated surface to a leading end of a first regenerated cellulose tubular food casing and a trailing end of a second regenerated cellulose tubular food casing wherein the ends are proximate each other, said splice being capable of passing over the horn ring of a stuffing horn while maintaining its integrity.

2. The splice of claim 1 wherein the splice will retain its integrity while passing over a horn ring on a stuffing horn which is from fifteen to twenty percent larger in circumference than the nominal uninflated circumference of the casing.

3. The splice of claim 1 wherein the casing is a premoisturized casing containing at least about twenty percent water based upon total casing weight.

4. The splice of claim 3 wherein the casing contains from 20 to 40 percent water based on total casing weight.

5. The splice of claim 1 wherein said ends abut each other.

6. The splice of claim 1 wherein the trailing end is telescoped into the leading end.

7. The splice of claim 1 wherein the splicing tape contains a marker which permits automatic identification and removal of the splice after it passes over a horn ring on a stuffing horn.

8. The splice of claim 7 wherein the marker comprises a pigment which can be detected by means of a photocell.

9. The splice of claim 7 wherein the marker comprises a substance which can be magnetically detected.

10. A splicing tape for food casing, said tape comprising a regenerated cellulose film coated on at least one surface with a saran polymer and having a film thickness of 0.002 to 0.01 inches and being perforated to remove from ten to thirty percent of the area of the film and to provide an elongation of from ten to at least twenty percent at a stretching tensile force of between 500 and 1250 psi in a direction transverse to the direction of the longitudinal axis of the casing, said tape having a tensile strength at break of at least 100 psi greater than the stretching tensile force.

11. A method of splicing tubular food casings, which comprises the steps of (a) assembling the trailing end of a first casing segment proximate the leading end of a second casing segment to form a joint, (b) contacting the segments across the joint with the splicing tape of claim 10, and bonding the joint by compressing and heating the tape at a temperature and pressure sufficient to secure the saran polymer to the casing segments.

* * * * *